(12) United States Patent
Koc et al.

(10) Patent No.: US 9,948,475 B2
(45) Date of Patent: Apr. 17, 2018

(54) PROVIDING ASSISTANCE TO A BASE STATION FROM USER EQUIPMENT

(71) Applicant: Intel Corporation, Santa Clara, CA (US)

(72) Inventors: Ali T. Koc, Hillsboro, OR (US); Satish C. Jha, Hillsboro, OR (US); Marta Martinez Tarradell, Hillsboro, OR (US); Sangeetha L. Bangolae, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 618 days.

(21) Appl. No.: 13/845,328

(22) Filed: Mar. 18, 2013

(65) Prior Publication Data

US 2013/0242832 A1  Sep. 19, 2013

Related U.S. Application Data

(60) Provisional application No. 61/612,188, filed on Mar. 16, 2012.

(51) Int. Cl.

| H04L 12/18 | (2006.01) |
|---|---|
| H04W 72/04 | (2009.01) |
| H04W 24/02 | (2009.01) |
| H04N 21/414 | (2011.01) |
| H04N 21/6408 | (2011.01) |
| H04W 4/06 | (2009.01) |
| H04L 5/00 | (2006.01) |
| H04L 5/14 | (2006.01) |
| H04L 1/18 | (2006.01) |

(Continued)

(52) U.S. Cl.
CPC .......... *H04L 12/189* (2013.01); *H04L 1/0033* (2013.01); *H04L 1/1635* (2013.01);
(Continued)

(58) Field of Classification Search
CPC ... H04L 12/189; H04L 5/0055; H04L 5/1438; H04L 5/0053; H04L 1/1896; H04L 1/14; H04L 65/601; H04L 1/0033; H04L 1/1825; H04L 1/1877; H04L 1/189; H04L 1/1887; H04L 1/1635; H04L 1/1664; H04L 5/001; H04L 5/1469; H04L 5/0073
See application file for complete search history.

(56) References Cited

U.S. PATENT DOCUMENTS

| 9,007,972 B2 | 4/2015 | Gupta et al. |
|---|---|---|
| 2003/0167343 A1 | 9/2003 | Furuno |

(Continued)

FOREIGN PATENT DOCUMENTS

WO    2011060998 A1    5/2011

OTHER PUBLICATIONS

Non-Final Office Action issued in corresponding U.S. Appl. No. 14/070,243 dated Nov. 18, 2015.
(Continued)

*Primary Examiner* — Ajay Cattungal
(74) *Attorney, Agent, or Firm* — Trop Pruner & Hu, P.C.

(57) ABSTRACT

In accordance with some embodiments, a user equipment or mobile station may provide assistance to the eNB or base station so that eNB or base station can more effectively provide settings to the user equipment. Because the user equipment may have more in depth knowledge about the conditions that exist at the user equipment, efficiencies may be achieved by providing information to the eNB from which the eNB can better set various settings on the user equipment, including those related to power saving and latency.

29 Claims, 8 Drawing Sheets

(51) Int. Cl.
| | |
|---|---|
| H04W 74/08 | (2009.01) |
| H04L 29/06 | (2006.01) |
| H04N 21/258 | (2011.01) |
| H04N 21/6405 | (2011.01) |
| H04W 24/00 | (2009.01) |
| H04W 28/02 | (2009.01) |
| H04W 72/08 | (2009.01) |
| H04W 76/04 | (2009.01) |
| H04L 1/00 | (2006.01) |
| H04L 1/16 | (2006.01) |
| H04L 12/28 | (2006.01) |
| H04W 52/24 | (2009.01) |
| H04L 29/08 | (2006.01) |
| H04W 52/02 | (2009.01) |
| H04W 52/14 | (2009.01) |
| H04W 72/12 | (2009.01) |

(52) U.S. Cl.
CPC ............ *H04L 1/189* (2013.01); *H04L 1/1825* (2013.01); *H04L 1/1854* (2013.01); *H04L 1/1864* (2013.01); *H04L 1/1877* (2013.01); *H04L 1/1887* (2013.01); *H04L 1/1896* (2013.01); *H04L 5/001* (2013.01); *H04L 5/0053* (2013.01); *H04L 5/0055* (2013.01); *H04L 5/0073* (2013.01); *H04L 5/14* (2013.01); *H04L 5/1438* (2013.01); *H04L 5/1469* (2013.01); *H04L 12/2854* (2013.01); *H04L 65/601* (2013.01); *H04L 67/02* (2013.01); *H04L 67/2842* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 52/243* (2013.01); *H04W 72/04* (2013.01); *H04W 72/042* (2013.01); *H04W 72/0406* (2013.01); *H04W 72/048* (2013.01); *H04W 72/0413* (2013.01); *H04W 72/0426* (2013.01); *H04W 72/082* (2013.01); *H04W 72/1205* (2013.01); *H04W 72/1242* (2013.01); *H04W 72/1273* (2013.01); *H04W 72/1284* (2013.01); *H04W 74/085* (2013.01); *H04W 76/048* (2013.01); *H04W 76/28* (2018.02); *H04L 1/1819* (2013.01); *H04W 52/0229* (2013.01); *H04W 52/143* (2013.01); *H04W 72/0446* (2013.01); *H04W 72/1268* (2013.01); *Y02B 60/50* (2013.01); *Y02D 70/00* (2018.01)

(56) References Cited

U.S. PATENT DOCUMENTS

| | | | |
|---|---|---|---|
| 2007/0067678 A1* | 3/2007 | Hosek | G05B 23/0235 714/25 |
| 2007/0075956 A1* | 4/2007 | Satou | G09G 3/3614 345/98 |
| 2007/0291673 A1 | 12/2007 | Demirhan | |
| 2008/0076403 A1* | 3/2008 | Park | H04W 4/10 455/422.1 |
| 2008/0232310 A1* | 9/2008 | Xu | H04W 76/048 370/329 |
| 2009/0093281 A1* | 4/2009 | Demirhan | H04W 52/0235 455/574 |
| 2009/0129339 A1* | 5/2009 | Young | H04W 76/046 370/331 |
| 2009/0180414 A1* | 7/2009 | Maeda | H04B 7/2643 370/311 |
| 2009/0262648 A1* | 10/2009 | Chun | H04W 76/048 370/241 |
| 2010/0034145 A1* | 2/2010 | Kim | H04W 76/048 370/328 |
| 2010/0118752 A1* | 5/2010 | Suzuki | H04W 52/0258 370/311 |
| 2010/0144299 A1* | 6/2010 | Ren | H04B 1/1615 455/226.1 |
| 2010/0163874 A1* | 7/2010 | Koyama | H01L 27/12 257/57 |
| 2010/0290509 A1* | 11/2010 | Dalsgaard | H04W 76/048 375/220 |
| 2011/0159895 A1* | 6/2011 | Arzelier | H04W 4/12 455/466 |
| 2011/0211466 A1* | 9/2011 | Kazmi | H04W 52/0261 370/252 |
| 2011/0292854 A1* | 12/2011 | Terry | H04L 5/001 370/311 |
| 2012/0170497 A1* | 7/2012 | Zhang | H04W 76/048 370/311 |
| 2012/0275366 A1* | 11/2012 | Anderson | H04W 52/0219 370/311 |
| 2012/0281561 A1* | 11/2012 | Shukla | H04W 76/068 370/252 |
| 2013/0223370 A1 | 8/2013 | Larmo et al. | |
| 2014/0148964 A1* | 5/2014 | Gan | G06Q 50/06 700/297 |
| 2014/0185467 A1* | 7/2014 | Heo et al. | 370/252 |

OTHER PUBLICATIONS

Final Office Action issued in corresponding U.S. Appl. No. 14/070,243 dated Jun. 3, 2016.
Non-Final Office Action issued in corresponding U.S. Appl. No. 14/070,243 dated Nov. 4, 2016.
International Search Report and Written Opinion dated Jan. 17, 2013 from International Applicaiton No. PCT/US2012/044449.
Australian office action dated Nov. 13, 2014 for Australian Patent Application No. 2012279365.
Extended European Search Report dated Dec. 11, 2014 for European Patent Application No. 12707727.8.
Australian Office Action dated Dec. 22, 2014 for Australian Patent Application No. 2012279365.
U.S. Office Action dated Aug. 13, 2015 from U.S. Appl. No. 14/642,404.
Canadian Office Action dated Oct. 27, 2015 from Canadian Patent Application No. 2,850,111.
Australian Office Action dated Feb. 4, 2016 from Australian Divisional Patent Application No. 2015205829.
International Preliminary Report on Patentability dated Jan. 16, 2014 from International Application No. PCT/US2012/044449.
Lindstrom et al., "LTD-Advanced Radio Layer 2 and RRC Aspects," 3GPP TSG-RAN WG2, Rev-090004, 3GPPLTE-Advanced Evaluation Workshop, Dec. 17-18, 2009, pp. 1-38.
Intel Corporation, "LTE Fast Dromancy," 3GPP TSG-RAN WG2 Meeting #72, R2-106825, Jacksonville, FL, USA, Nov. 15-19, 2010, 7 pages.
Research in Motion UK Limited, "Way Forward for LTE RAN Enhancements for Diverse Data Applications," 3GPP TSG-RAN WG2 Meeting #73bis, R2-112171, Shanghai, China Apr. 11-15, 2011, 4 pages.

* cited by examiner

PROVIDING ASSISTANCE TO A BASE STATION FROM USER EQUIPMENT

CROSS-REFERENCE TO RELATED APPLICATIONS

This application claims priority to Provisional Application Ser. No. 61/612,188, filed Mar. 16, 2012, hereby expressly incorporated by reference herein.

BACKGROUND

This relates generally to processor-based devices that are capable of wireless communications.

A mobile station or user equipment may communicate with a base station or evolved or enhanced node B (eNB). Generally, the base station controls all of the radio access network (RAN) mechanisms in order to support the user equipment (UE). In other words, typically all of the settings on the user equipment are controlled by the base station. For example, the discontinuous reception (DRX) cycle specifies the periodic repetition of the on duration of the user equipment, followed by a possible period of inactivity. Generally, the DRX cycle is specified to the user equipment from the base station or eNodeB. To some degree, the eNodeB sets the DRX cycle even though it is substantially oblivious to conditions that may exist at the user equipment.

Embodiments may find application in a wireless local area network (WLAN) or a wireless wide area network (WWAN) including a WiMAX (Worldwide Interoperability for Microwave Access) network or the like. WiMAX technology is based on the IEEE 802.16 family of standards, including IEEE 802.16e, IEEE 802.16m, and others. Embodiments herein may also be applicable to other WWANs such as those operating according to 3GPP Long Term Evolution (LTE) or LTE-Advanced, or similar, follow-on wireless standards. Further, while several specific standards have been set forth herein as examples of suitable applications, implementations herein are not limited to any particular standard or protocol.

BRIEF DESCRIPTION OF THE DRAWINGS

Some embodiments are described with respect to the following figures.

DETAILED DESCRIPTION

Figure 1:
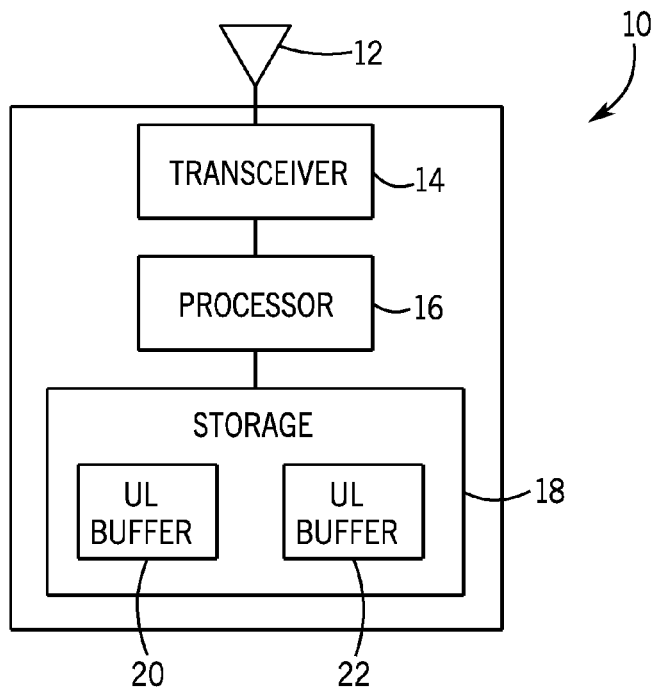
FIG. 1 is a schematic depiction of a user equipment according to one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

In accordance with some embodiments, a user equipment or mobile station may provide assistance to the eNB or base station so that eNB or base station can more effectively provide settings to the user equipment. Because the user equipment may have more in depth knowledge about the conditions that exist at the user equipment, efficiencies may be achieved by providing information to the eNB from which the eNB can better set various settings on the user equipment, including those related to power saving and latency.

Many smart phones with diverse mobile Internet applications running on them may have in depth knowledge about various conditions, including power usage and quality of experience requirements of applications running on the user equipment. This information may be conveyed from the user equipment to the eNB, in some embodiments, to assist in more effectively controlling the user equipment.

Examples of user equipment assistance include enabling the eNB to customize the discontinuous reception (DRX) mechanism on a per-user equipment basis based on the user equipment power constraints and quality of experience requirements of applications running on the user equipment. Yet another example is allowing user equipment assisted connection release indications to the network.

The user assistance information conveyed from the user equipment to the eNB may include information about the user battery constraint indications, the user equipment DRX parameter information, the user equipment quality of experience metrics of interest, such as latency based on applications running on the user equipment and specific user equipment requests, such as a request to go to idle mode.

The user equipment battery constraint indicator allows the user equipment to communicate with the eNB about limitations on the power consumption of the user equipment. When enabled, this indicator indicates that the user equipment would like to be in a maximum power saving mode. Generally, this translates into requesting the longest possible DRX cycle length.

Among the reasons why the user equipment would enable such an indicator is that the user equipment is below a battery level threshold and would like to have ON periods only on an as needed basis or if the user equipment is a device with power consumption constraints. In any case, the user equipment may request that the eNB update its DRX parameters to optimize power consumption at the user equipment.

In one embodiment, if the user equipment battery constraint indicator is set to zero, the user equipment does not have any power restriction and DRX parameters do not need to be selected specifically to optimize power consumption, but may be used in conjunction with achieving quality of experience metrics of various applications running on the user equipment. If the user equipment battery constraint indicator is set to enable, the user equipment has power restrictions and the eNB should select the more appropriate DRX parameters to minimize the power consumption of the user equipment.

The user equipment quality of experience metrics of interest, such as latency, depend on the behavior of applications running on the user equipment. The user equipment can implement internal algorithms to track the applications and get input from other modules in higher layers to better understand the quality of experience requirements and make decisions about power consumption versus latency optimization. Then, the most suitable DRX parameters can be identified and the assistance information may be updated and sent over the network to the eNB.

Generally, it may be easier at the user equipment side to develop an algorithm to communicate with other modules in higher layers to explore quality of experience requirements of all applications. This may, in part, be due to the fact that the eNB may not have access to all the higher layer protocol stacks of an application running on the user equipment. Moreover, the user equipment may predict the traffic patterns of applications running on it by communicating with other modules in higher layer protocols. If the user equipment sees a minimum probability of having traffic for some amount of time, it can provide user equipment assistance to the eNB to release the radio bearer and allow it to move to idle state in order to save battery power.

The user equipment battery constraint indicator may be updated to the eNB even if the user equipment does not have any DRX parameter settings to propose or a quality of experience metric to satisfy. For example, application characteristics may have changed and the user equipment may want to update the network about the new DRX parameters and quality of experience metric constraints. However, the eNB may or may not take the suggestions into consideration and may or may not make the decision based on criteria such as network load or congestion and other network requirements.

The user equipment DRX parameter information message can be sent by the user equipment if the DRX capability is enabled and the user equipment discovers the need to update its current DRX settings. The user equipment may suggest the eNB adopt and apply the indicated change to the DRX parameters of the user equipment.

The nature of the user assistance information that is sent can vary based on the needs of the user equipment and the capabilities of the eNB. DRX user equipment assistance information may include several parameters, such as the drx-InactivityTimer that specifies the number of consecutive physical downlink control channel (PDCCH) (sub-frames) after the sub-frame in which a PDCCH indicates an initial uplink or downlink user data transmission for this user equipment, a drx ShortCycleTimer specifying the number of consecutive sub-frame or frames user equipment follows a short DRX cycle, a long DRX cycle and ON duration, a drx RetransmissionTimer that specifies the maximum number of consecutive sub-frames before a downlink retransmission is expected by the user equipment, to mention a few examples. The user equipment can send a request for specific DRX parameters or the user equipment can send the preference information, such as battery constraint indicator, quality of experience based on application and intention to go into the idle mode.

One option is to send the intention or indication that the user equipment is going into the idle mode. The idle mode is the most power efficient state of the user equipment. When the user equipment determines that there will not be traffic activity for a while, it can indicate its intention or desire to go into the idle mode.

Another option is to send a battery constraint indicator or quality of experience requirement in the context of a DRX setting. The eNB may then decide about DRX settings based on this information. For example, when the user equipment battery power is of critical importance, eNB may select a DRX setting to maximum power savings. If quality of experience, such as low latency, is crucial, the eNB may chose delay maximized DRX settings. Power saving is usually maximized for longer DRX cycle length with shorter inactivity time. The longer DRX cycle length help the user equipment to stay in the DRX sleep for a longer time, which reduces power consumption, while shorter inactivity time brings the user equipment into DRX sleep mode more frequently. For similar reasons, a delay can be minimized by selecting shorter DRX cycles and longer inactivity timers.

As still another option, the user equipment may request specific DRX parameters. For this option, there may be multiple predefined sets of DRX parameters that are known by the user equipment and the eNB. The user equipment would then only need to indicate which set of parameters it would like to use.

As yet another option, the user equipment can request an increase or decrease of specific DRX parameters using incremental messaging (i.e. sending one parameter at a time). In this case, other DRX parameters remain the same, while one parameter, such as DRX cycle length, may change. For example, the DRX cycle length can be increased or decreased to the next level in response to such a request.

As still another option, specific DRX parameters may be specified by the user equipment. The user equipment may prefer to indicate the most optimum DRX parameters it would like to use, for example, based on perceived behavior of the applications running on the user equipment.

Referring to FIG. 1, the user equipment 10 may include a radio antenna 12 coupled to a wireless transceiver 14. The transceiver may be coupled to a processor 16. The processor 16 may be coupled to storage 18.

In some implementations, the processor 16 can be a single processing unit or a number of processing units, all of which may include multiple computing units or multiple cores. The processor 16 may be implemented as one or more microprocessors, microcomputers, microcontrollers, digital signal processors, central processing units, state machines, logic circuitries, and/or any devices that manipulate signals based on operational instructions. Among other capabilities, the processor 16 can be configured to fetch and execute processor-executable instructions stored in the storage 18, respectively, or other processor-readable storage media.

The storage 18 can include any processor-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks, or the like, or any combination thereof. The storage 18 may store computer-readable processor-executable program instructions as computer program code that can be executed by the processor 16 as a particular machine for carrying out the methods and functions described in the implementations herein. Further, storage 18 may also include other program modules stored therein and executable by processor 16 for carrying out implementations herein, such codecs, or the like.

Additionally, transceiver 14 may be implemented in a variety of devices and systems, such as cellular communications systems. Wi-Fi systems, or the like. For example, transceiver 14 might be incorporated in a mobile computing device, such as a cell phone, smart phone, laptop, wireless access point, a second computing device, or the like, or vice versa. Further, while exemplary system architectures have been described, it will be appreciated that other implementations are not limited to the particular system architectures described herein. For example, the techniques and architectures described herein may be incorporated in any of a variety of wireless communication devices, and implementations herein are not limited to any type of communication devices.

Figure 2:
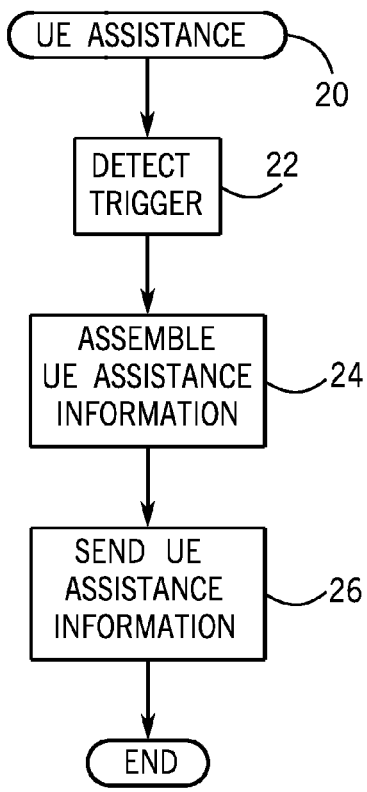
FIG. 2 is a flow chart for one embodiment.

Referring to FIG. 2, a sequence 20 for user assistance may be implemented in software, firmware, and/or hardware. In software and firmware embodiments, it may be implemented by computer executed instructions stored in one or more computer readable media, such as a magnetic, optical, or semiconductor storage. To this end, the storage 18 may be used in some embodiments.

The user assistance sequence 20 begins by detecting a trigger, as indicated in block 22. The trigger may be a battery constraint indicator or a traffic activity change, as two examples. Then, the user assistance information may be assembled, as indicated in block 24. As discussed above, there are a variety of types and specific items of information that the user equipment may choose to send, in some embodiments. For example, the user equipment can analyze its own quality of experience requirements and power capabilities, together with power consumption rates, in order to decide exactly what information should be assembled and sent to the eNB. Then, the user equipment actually sends the assistance information to the eNB, as indicated in block 26.

The user assistance information can be sent to the eNB by a medium access control (MAC) control element or with msg3 during Random Access process. An msg3 is a message transmitted on an uplink shared channel containing a cell radio network temporary identifier medium access control control element or a common control channel (CCCH) service data unit (SDU), submitted from upper layer and associated with a user equipment contention resolution identity, as part of a random access procedure. In the first option, the uplink medium access control control element may be used. An uplink medium access control control element can be defined to send user equipment assistance information to the eNB. For example, predefined sets of DRX parameters may be prearranged. These predefined multiple sets of DRX parameters are available at the eNB. Some of them may be designed for power saving with larger cycle length and shorter inactivity times, some may be good for low delay with shorter cycle length and longer inactivity time, while some may be in between with moderate power saving and moderate delay. The number of sets is finite and a maximum number of possible sets depends on the medium access control control element data field length.

If a user equipment has adaptive or multiple DRX capability enabled, the eNB may send these sets by including them in a DRX-Config message in the MAC-MainConfig information element (IE) during radio resource control (RRC) connection establishment. The MAC-MainConfig IE can be sent to the user equipment through the RRC connection reconfiguration message which is a downlink common control channel (DL-CCCH) RRC message. The user equipment may indicate its DRX capability to the eNB by an RRCConnectionRequest. Therefore, the user equipment and the eNB know the available DRX sets.

Figure 3:
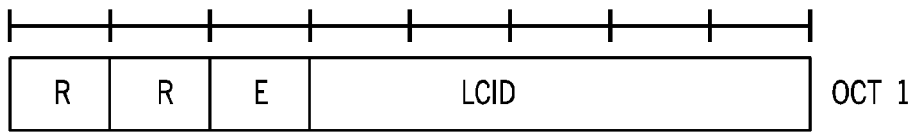
FIG. 3 is a control element header according to one embodiment.

A modified DRX medium access control control element for uplink shown in FIG. 3, may have a header field of the format R/R/E/LCID and a control element of length one octet. A new value for the logical control identifier (LCID) for the uplink shared channel may be aligned with the uplink DRX medium access control control element. One of the reserved LCID areas (01011-11000) for the uplink shared channels may be used for this purpose, in one embodiment. See ETSI TS 36.321 (¶6.2.1), available from European Telecommunications Standards Institute V11.1.0 (2013-02). The two values R are reserved for future use and the value E, is for an extension bit to indicate the presence of an extended length header.

Figure 4:
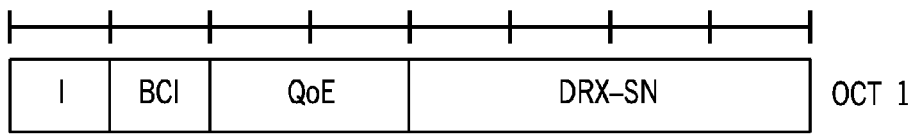
FIG. 4 is an uplink DRX medium access control (MAC) element.

In FIG. 4, a medium access control control element is shown. The number of bits assigned for each element is, of course, variable. In one example, the I field is one bit long and it indicates an intention to go into the idle mode. I equal one may mean that the user equipment wants to go in the idle mode. When I equals one, the other bits may be ignored by the eNB. The BCI field may be one bit and is the battery constraint indicator. A BCI equals one indicates that the user equipment has a battery power constraint. Otherwise, there is no battery power constraint. A QoE field of two bits is a quality of experience indicator that indicates the quality of assurance in terms of latency. Four levels of latency requirements can be assigned, in one embodiment, using two bits. A DRX-SN field may be four bits to indicate a DRX set number. It indicates which DRX set of values to select. The number of sets may be from zero to 15 to achieve desired quality of experience and power saving tradeoffs. For example, the value 0000 may indicate that the user equipment does not want to change the DRX set. It may be used when the user equipment only wants to update the battery constraint indicator and quality of experience bits to the eNB.

An eNB can reply to the user equipment either by sending the RRCConnectionReconfiguration message or the downlink DRX medium access control control element (LCID=11110) with its response. The final decision about selecting a new DRX set or going to idle mode may be made by the eNB, in some embodiments. That is, the eNB may accept the user equipment request to select a particular DRX set or to move to the idle mode. However, based on global network-wide information, such as network congestion and loading, in some embodiments the eNB can make the final decision about the new DRX setting. The received user equipment assistance information can also be used for other purposes in the network.

If an eNB replies through a DRX medium access control control element, the current downlink DRX medium access control control element (LCID=11110) is only able to send a DRX command to start the DRX cycle. It does not have the capability to carry any further information, such as a new DRX set number, as it has a data field of size zero.

Figure 5:
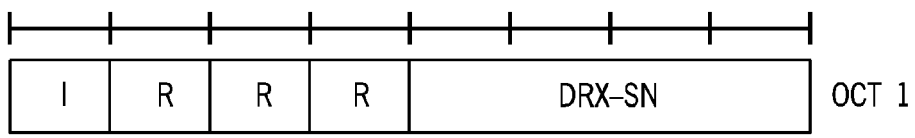
FIG. 5 is a depiction of an added data field to a modified downlink DRX medium access control (MAC) control element according to one embodiment.

Thus, in some embodiments, the DRX medium access control control element may be modified by adding a data field of one octet, as shown in FIG. 5. In FIG. 5, the I bit is the idle mode set bit and I equals one means that the user equipment should go to the idle mode. When I equals one, other bits may be ignored by the eNB.

There may be three R bits reserved for future use. The DRX-SN may be four bits and may be the DRX set number indicating a selected set with the number of sets zero to 15 in this example. Again, the value 0000 may indicate that the user equipment should continue with its current DRX setting.

As another option, the reserved field (R) of the DRX medium access control control element can be used to send a response to the user equipment. However, the options may be limited. The eNB may not be able to send the new DRX set number, for example.

Figure 6:
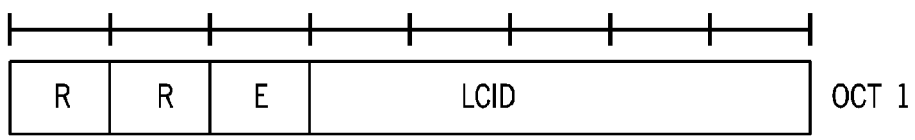
FIG. 6 is a downlink DRX medium access control control element subheader according to one embodiment.

Thus, as shown in FIG. 6, a sub-header for the downlink DRX medium access control control element is depicted according to one embodiment. If R and R are zero and zero, this is the current default setting. If R and R are zero and one, the current DRX setting is kept. If R and R are one and zero, then the user equipment request is changed. That is, the DRX setting is changed to the new set as specified by the user equipment in the uplink DRX medium access control control element. If R and R are both one, the idle mode is specified.

As another example of a technique to send the user assistance information, the DRX cycle may be changed and/or the inactivity timer may be changed. The user equipment may include a request for only a specific DRX cycle and/or an inactivity timer in the user equipment assistance information. Other DRX parameters continue to be used from the default set. The default set of DRX parameters means the DRX is sent by the eNB to the user equipment during the connection set up.

The user equipment assistance information transfer mechanism for this case may use a modified DRX medium access control control element for uplink, which has a header field of the format R/R/E/LCID and a control element of length one octet. The new value of LCD for the uplink shared channel may be assigned or the uplink DRX medium access control control element. One of the reserved LCIDs for the uplink shared channel may be used for this purpose.

Figure 7:
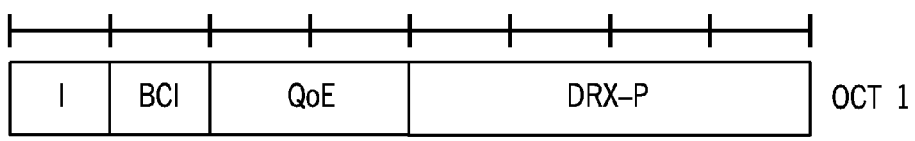
FIG. 7 is a downlink DRX medium access control control element according to one embodiment.

Thus, referring to FIG. 7, the downlink DRX medium access control control element may be one octet in length. The I variable may indicate an intention to go to idle mode with I equals one meaning that the user equipment wants to go to the idle mode. When I equals one, the other bits may be ignored by the eNB. The BCI bit may be a battery constraint indicator with the bit equal to one indicating that the user equipment has a power constraint. The quality of experience may be two bits, indicating a desired latency. In one embodiment, four levels of latency may be assigned. Finally, the DRX-P may be four bits, which may indicate a DRX parameter. The DRX-P parameter indicates which DRX cycle length and/or inactivity timer the user equipment intends to select. There may be 15 sets selected by four bits. For example, the value 0000 may indicate that the user equipment does not want to change the DRX set. It may be used when the user equipment only wants to update the battery constraint indicator or the quality of experience bits to the eNB.

The DRX-P bits may be mapped to different DRX parameters. In the case A, only the DRX cycle length is changed. In this case 15 out of the 20 possible values of the DRX cycle can be mapped to the DRX-P bits. For example, 0001 may represent the DRX cycle length of 32 milliseconds. In case B, a pair of DRX parameters, such as DRX cycle length and inactivity timer, may be chosen and indicated. Here 15 possible combinations of DRX cycle length and inactivity timer can be defined and mapped to the DRX-P bits. For example, 0001 may indicate a DRX cycle of length 32 milliseconds and an inactivity timer length of 30. One of the R bits can be used to indicate whether case A or case B has been chosen.

In some embodiments, in case B, the eNB can reply to the user equipment, either by sending an RRCConnectionReconfiguration message or a downlink DRX medium access control control element with its response. If the eNB replies through a DRX medium access control control element, the current downlink DRX medium access control control element is only able to send the DRX command that starts the DRX cycle. It does not have the capability to carry any further information, such as a new DRX parameter, if it has a field size of zero.

Therefore, the DRX medium access control control element may be modified by adding a data field of one octet. In this case, the I bit may indicate an idle mode as above. Three R bits may not be used and may be reserved for future use. The DRX-P parameters may be four bits, indicating which DRX cycle length or inactivity timer the user equipment should use. The DRX cycle length and/or inactivity timer can be decided as described above in connection with cases A and B. Again, one of the R bits may be needed to decide whether case A or B is selected.

If the random access process is in progress, a random access channel (RACH) msg3 can be used to send the user equipment assistance information. The random access channel process is used by the user equipment if an uplink grant is required and there is no defined scheduling request. The contention resolution process is used if the radio resource control (RRC) connection is not established and a contention free resolution is generally used if the user equipment is in RRC_Connected state.

Figure 8:
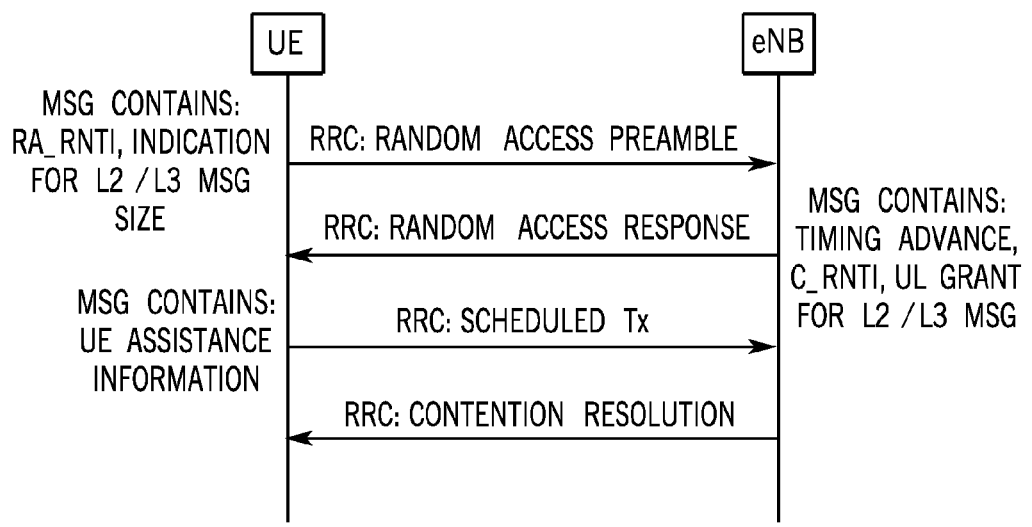
FIG. 8 is a message exchange between a user equipment and an eNodeB according to one embodiment.

The procedure starts with the user equipment (UE) sending an msg1, as shown in FIG. 8, which contains the reference to the L2/L3 message size indication, indicating the size of the user equipment assistance information being sent, along with any indication for the eNB to expect this information.

Once the uplink grant is received, in msg2 from the eNB, as part of the MSG3, the user equipment assistance information itself can be sent from the user equipment to the eNB.

The message contents may be according to the specification which indicates that a medium access control random access response is of fixed size and consists of the following fields. See ETSI TS 36.321 V11.1.0 (2013-02) at 6.2.3 (page 46) available from the European Telecommunications Standards Institute. R is the reserved bit set to zero. The timing advance command field indicates the index value TA (0,1,2 . . . 1281) used to control the amount of timing adjustment that the user equipment has to apply. The size of the timing advance field is 11 bits. The uplink (UL) grant field indicates the resource to be used on the uplink. The size of the uplink grant field is 20 bits. The temporary C-RNTI field indicates the temporary identity that is used by the user equipment during random access. The size of this field is 16 bits. The medium access control random access response is octet aligned.

Thus there are at least two general ways that a DRX setting may be changed. One is a user equipment information request may be sent and accepted by the eNodeB which then implements a change. Another option is that the change is initiated at the eNodeB. This latter option may be the result of a wholly eNodeB initiated change or a decision by the eNodeB to choose different DRX parameters based on network conditions than those suggested by the user equipment.

Figure 9:
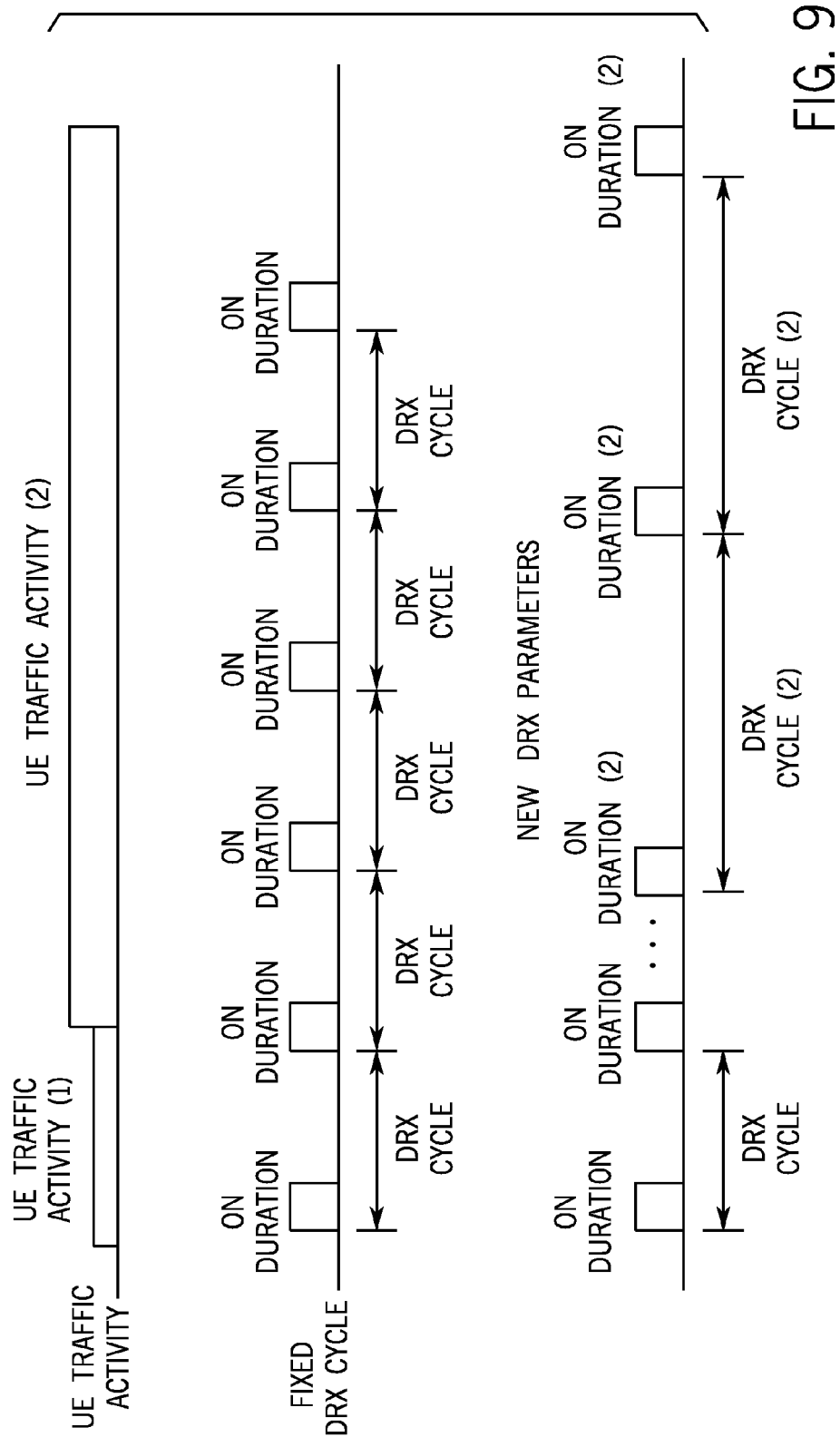
FIG. 9 is a timing diagram for DRX switching parameters based on user equipment traffic activity according to one embodiment.

Referring to FIG. 9, the first line shows the user equipment traffic activity with an activity increase after a DRX cycle. Thus the system changes from user equipment traffic activity at level 1 to activity 2. When the user equipment traffic activity changes, the user equipment may update the eNodeB and the eNodeB agrees to change the user equipment DRX parameters in this case. Then the fixed DRX cycle is shown in the second line in FIG. 9. But based on the activity change, a DRX cycle switching may be implemented, in which the ON duration stays the same but the DRX cycle length is increased.

After DRX parameter selection, the eNodeB may provide its decision to the user equipment either by an RRCConnectionReconfiguration message or by a DRX medium access control control element or by another equivalent message that may be created to enhance current procedure to convey DRX parameters between an eNodeB and the user equipment. Currently, the DRX medium access control control element defined in the specification (ETSI TS 136.321 V11.1.0 (2013-02) (¶6.1.3.3) available from the European Telecommunications Standards Institute) has a data field of length zero. Sending the selected DRX parameters by a DRX medium access control control element necessitates an addition of a data field to fixed length.

After a new DRX parameter is decided on, the user equipment may start using the new DRX parameters in synchronism with the eNodeB to avoid misalignment in terms of downlink or uplink packet buffering and activity.

If the user equipment only has one set of unchanged DRX parameters (one value per DRX cycle, DRX inactivity on duration, etc.). The existing procedures can be used. When the user equipment is using a group of DRX parameters and decides to start using a new group of DRX parameters (for example due to the reception of a new group of DRX parameters), the user equipment does not start using them right away as it is already using old values. Instead the user equipment continues using the old DRX parameters indicated at DRX1 in FIG. 10 until the user equipment has to enter the DRX cycle again. At this point, the user equipment starts using the new DRX parameters (DRX2 in FIG. 10) instead of starting the old ON duration time and following the old DRX cycle. eNodeB continues to mimic this timing, using the same behavior.

Figure 10:
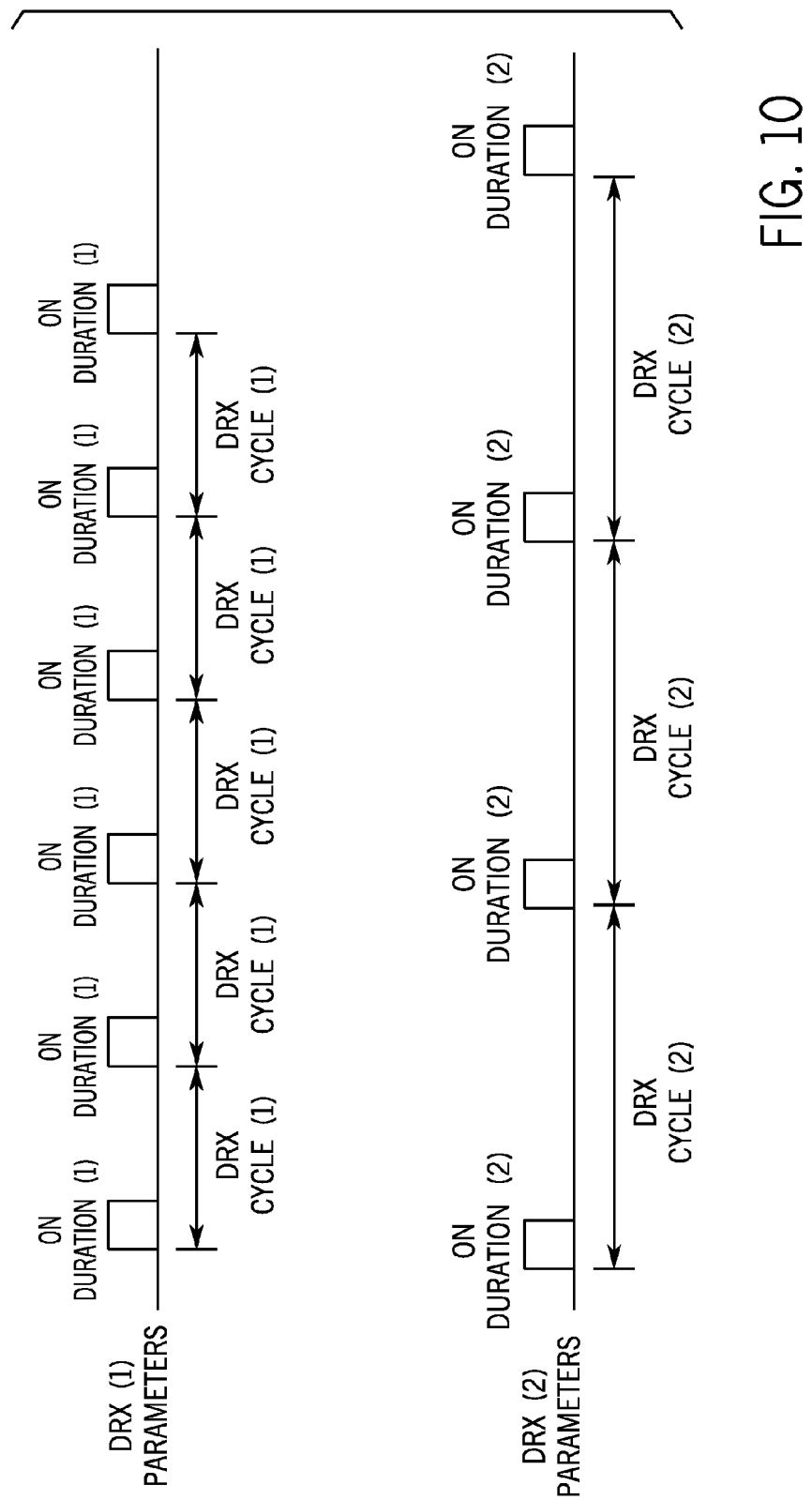
FIG. 10 is a timing diagram for two different DRX cycle settings according to one embodiment.
Figure 11:
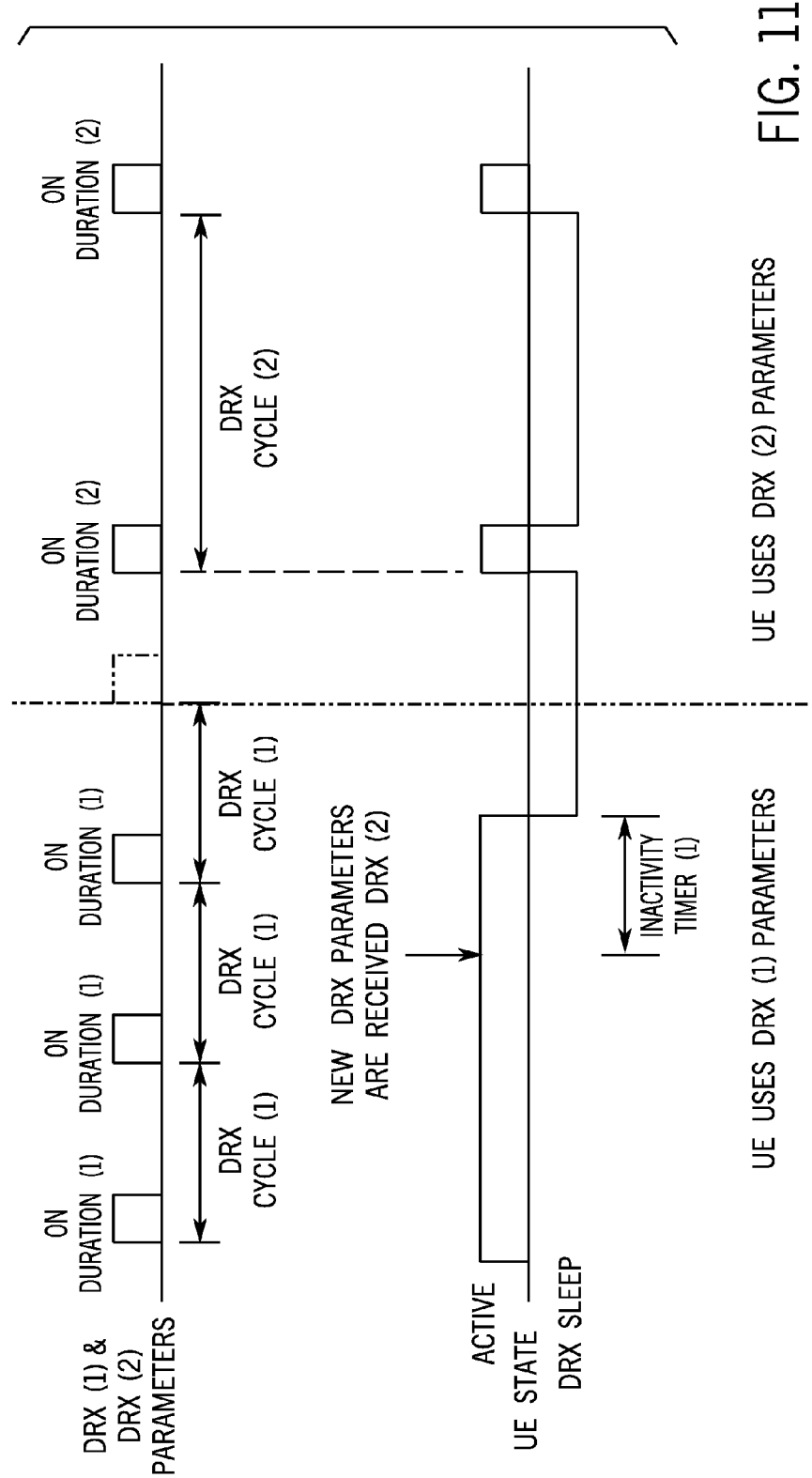
FIG. 11 is a timing diagram for DRX parameters while the user equipment is active according to one embodiment.
Figure 12:
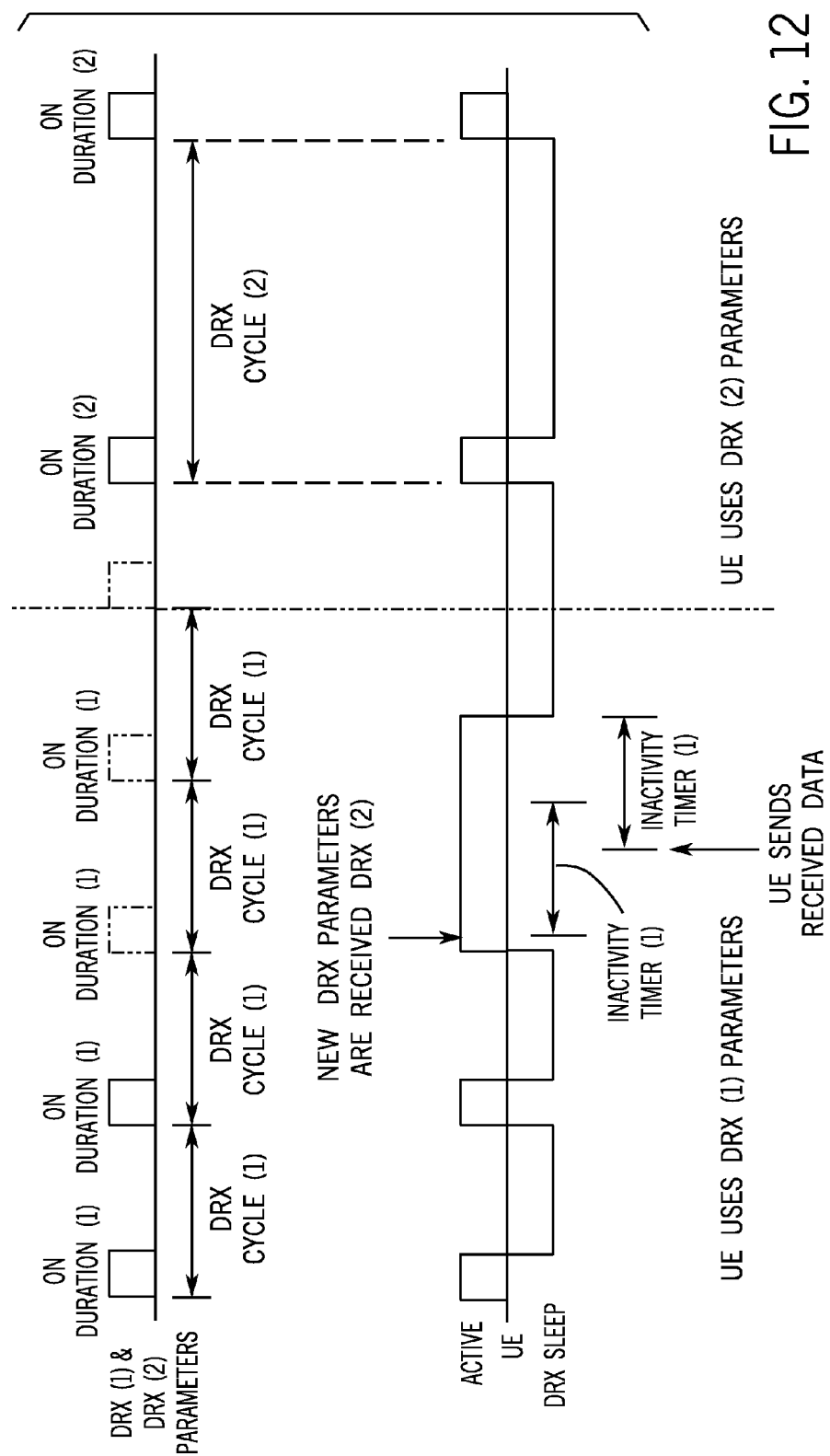
FIG. 12 is a pair of timelines showing DRX parameters changing while a user equipment is active and there is some traffic activity according to one embodiment.

In FIG. 10, the difference between two DRX cycles that are used in FIGS. 11-12 are shown. The user equipment might need to use different DRX settings based on its own requirements or based on the eNodeB indication for various reasons such as new traffic requirements or network congestion.

In FIG. 11, the user equipment is actively sending or receiving data and has its DRX functionality enabled and configured to the DRX1 setting shown in FIG. 10. At a given moment, a new DRX setting, called DRX2, is triggered for the user equipment. Again, the user equipment does not start using these values right away but instead continues to use the old DRX settings until the next time the user equipment has to enter the old DRX cycle. At that point, the user equipment does not use the old ON duration timer but rather starts using the new DRX settings called DRX2 and proceeds based on those settings to determine its current state either active or inactive.

If the user equipment is in a DRX cycle when it receives the DRX parameter change to the new setting value DRX2, it restarts the old activity timer and continues using the old DRX settings until the next time the user equipment has to enter into the old DRX cycle, as indicated in FIG. 12. In FIG. 12, it is assumed that there is no traffic activity so the user equipment goes into the DRX cycle and the next time it enters the old DRX cycle, it starts using the new DRX settings, DRX2, and acts based on the new settings to identify its current state.

Figure 13:
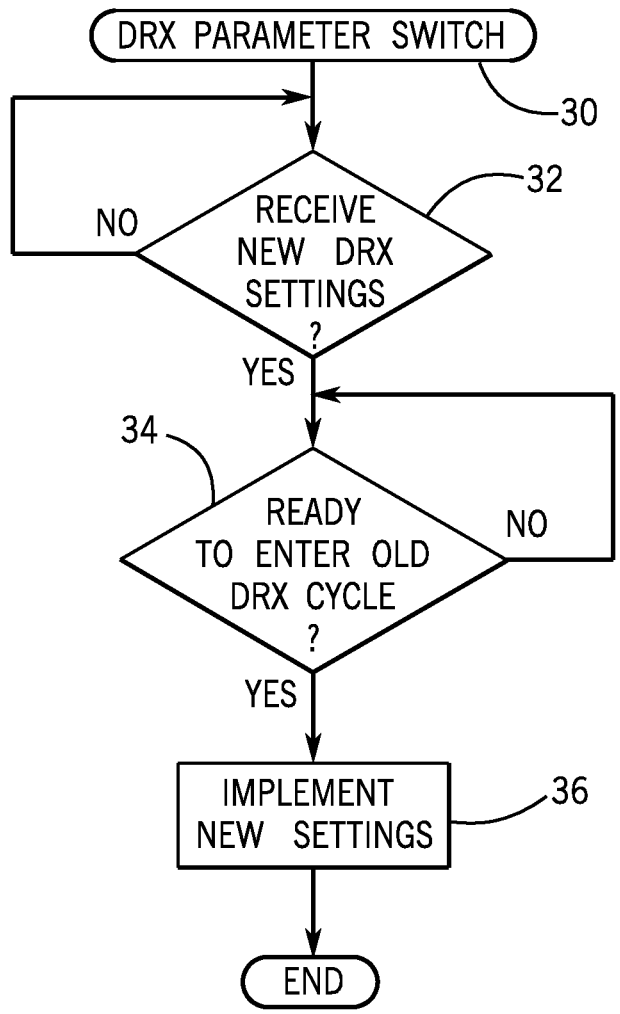
FIG. 13 is a flow chart for one embodiment.

Referring to FIG. 13, the DRX parameter switching sequence 30 may be implemented in software, firmware and/or hardware. In software and firmware embodiments it may be implemented by computer executed instructions stored in one or more non-transitory computer readable media such as magnetic, optical, or semiconductor storages. For example the storage 18 may be used for this purpose in some embodiments.

The sequence 30 begins by checking at diamond 32 to determine whether new DRX settings have been received. If so, a check at diamond 34 determines whether user equipment is ready to enter the old DRX cycle. If not, it continues to implement the old cycle and does not make any changes.

On the contrary, if it is ready to enter the old DRX cycle, then it implements the new settings as indicated at block 36 upon entry into the new cycle as also indicated in FIG. 8.

The following clauses and/or examples pertain to further embodiments:

One example embodiment may be a method comprising detecting at user equipment a condition, assembling user equipment assistance information based on said condition, and sending the user equipment assistance information to an enhanced node B to enable the enhanced node B to change an operating condition of said user equipment. The method may also include detecting a condition related to a discontinuous reception. The method may also include detecting a condition related to a quality of experience. The method may also include detecting a battery constraint condition. The method may also include detecting a request to go to idle mode. The method may also include sending includes sending a suggested discontinuous reception parameter. The method may also include using a plurality of bits to indicate a selected set of discontinuous reception parameters. The method may also include using a plurality of bits to indicate a specific value for a discontinuous reception parameter. The method may also include using an uplink medium access control control element to send the information. The method may also include using a random access channel msg3 to send the user equipment assistance information.

In another example embodiment one or more non-transitory computer readable media storing instructions to cause a processor in a wireless device to perform a sequence comprising detecting at user equipment a condition, assembling user equipment assistance information based on said condition, and sending the user equipment assistance information to an enhanced node B to enable the enhanced node B to change an operating condition of said user equipment. The media may further store instructions to perform a sequence including detecting a condition related to a discontinuous reception. The media may further store instructions to perform a sequence including detecting a condition related to a quality of experience. The media may further store instructions to perform a sequence including detecting a battery constraint condition. The media may further store instructions to perform a sequence including detecting a request to go to idle mode. The media may further store instructions to perform a sequence wherein sending includes sending a suggested discontinuous reception parameter. The media may further store instructions to perform a sequence including using a plurality of bits to indicate a selected set of discontinuous reception parameters. The media may further store instructions to perform a sequence including using a plurality of bits to indicate a specific value for a discontinuous reception parameter. The media may further store instructions to perform a sequence including using an uplink medium access control control element to send the information. The media may further store instructions to perform a sequence including using a random access channel msg3 to send the user equipment assistance information.

Another example embodiment may be an apparatus comprising a processor to detect at user equipment a condition and assemble user equipment assistance information based on said condition, and a transceiver to send the user equipment assistance information to an enhanced node B to enable the enhanced node B to change an operating condition of said user equipment. The apparatus may include said processor to detect a condition related to a discontinuous reception. The apparatus may include said processor to detect a condition related to a quality of experience. The apparatus may include said processor to detect a battery constraint condition. The apparatus may include said processor to detect a request to go to idle mode. The apparatus may include said transceiver to send to a suggested discontinuous reception parameter. The apparatus may include said transceiver to use a plurality of bits to indicate a selected set of discontinuous reception parameters. The apparatus may include said transceiver to use a plurality of bits to indicate a specific value for a discontinuous reception parameter. The apparatus may include said transceiver to use an uplink medium access control control element to send the information. The apparatus may include said transceiver to use a random access channel msg3 to send the user equipment assistance information.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    detecting at user equipment information about a power consumption mode limitation of user equipment;
    assembling user equipment assistance information based on said limitation; and
    sending the user equipment assistance information to an enhanced node B to enable the enhanced node B to change an operating condition of said user equipment to meet said limitation.

2. The method of claim 1 including detecting a condition related to a discontinuous reception (DRX) operation.

3. The method of claim 1 including detecting a battery constraint condition.

4. The method of claim 1 including detecting a request to go to idle mode.

5. The method of claim 1 wherein sending includes sending a suggested discontinuous reception parameter.

6. The method of claim 5 including using a plurality of bits to indicate a selected set of discontinuous reception parameters.

7. The method of claim 5 including using a plurality of bits to indicate a specific value for a discontinuous reception parameter.

8. The method of claim 1 including using an uplink medium access control control element to send the information.

9. The method of claim 1 including using a random access channel msg3 to send the user equipment assistance information.

10. One or more non-transitory computer readable media storing instructions to cause a processor in a wireless device to perform a sequence comprising:
    detecting at user equipment information about a power consumption mode limitation of user equipment;
    assembling user equipment assistance information based on said limitation; and
    sending the user equipment assistance information to an enhanced node B to enable the enhanced node B to change an operating condition of said user equipment to meet said limitation.

11. The media of claim 10 further storing instructions to perform a sequence including detecting a condition related to a discontinuous reception.

12. The media of claim 10 further storing instructions to perform a sequence including detecting a condition related to a quality of experience.

13. The media of claim 10 further storing instructions to perform a sequence including detecting a battery constraint condition.

14. The media of claim 10 further storing instructions to perform a sequence including detecting a request to go to idle mode.

15. The media of claim 10 further storing instructions to perform a sequence wherein sending includes sending a suggested discontinuous reception parameter.

16. The media of claim 15 further storing instructions to perform a sequence including using a plurality of bits to indicate a selected set of discontinuous reception parameters.

17. The media of claim 10 further storing instructions to perform a sequence including using a plurality of bits to indicate a specific value for a discontinuous reception parameter.

18. The media of claim 10 further storing instructions to perform a sequence including using an uplink medium access control control element to send the information.

19. The media of claim 18 further storing instructions to perform a sequence including using a random access channel msg3 to send the user equipment assistance information.

20. An apparatus comprising:
    a processor to detect information about a power consumption mode limitation of user equipment assistance information based on said limitation; and
    a transceiver to send the user equipment assistance information to an enhanced node B to enable the enhanced node B to change an operating condition of said user equipment to meet said limitation.

21. The apparatus of claim 20, said processor to detect a condition related to a discontinuous reception.

22. The apparatus of claim 20, said processor to detect a condition related to a quality of experience.

23. The apparatus of claim 20, said processor to detect a battery constraint condition.

24. The apparatus of claim 20, said processor to detect a request to go to idle mode.

25. The apparatus of claim 20, said transceiver to send to a suggested discontinuous reception parameter.

26. The apparatus of claim 25, said transceiver to use a plurality of bits to indicate a selected set of discontinuous reception parameters.

27. The apparatus of claim 25, said transceiver to use a plurality of bits to indicate a specific value for a discontinuous reception parameter.

28. The apparatus of claim 20, said transceiver to use an uplink medium access control element to send the information.

29. The apparatus of claim 20, said transceiver to use a random access channel msg3 to send the user equipment assistance information.

\* \* \* \* \*